March 3, 1942.  J. B. MURRAY  2,274,908
FILING APPARATUS
Filed Jan. 23, 1941  3 Sheets-Sheet 1
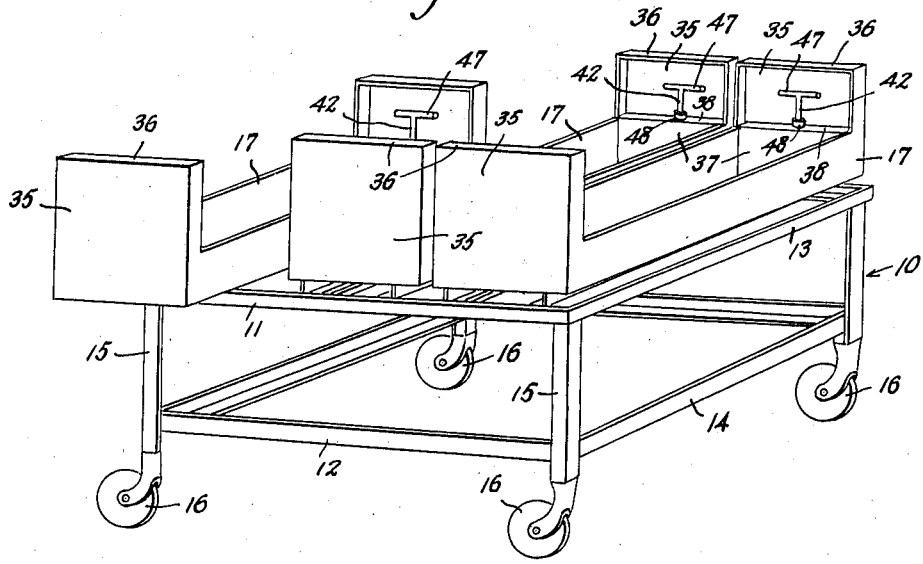
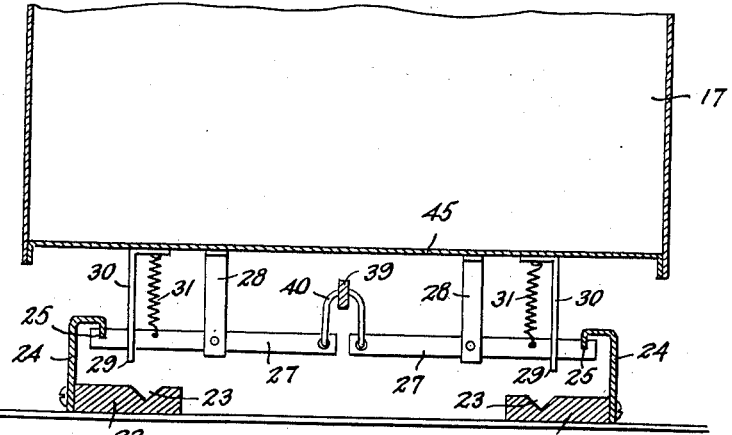
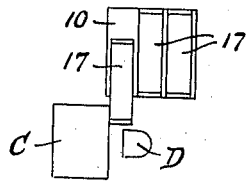 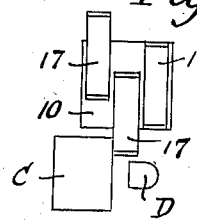 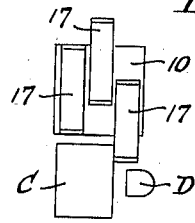
INVENTOR.
JAMES B. MURRAY
BY Clark + Ott
ATTORNEYS

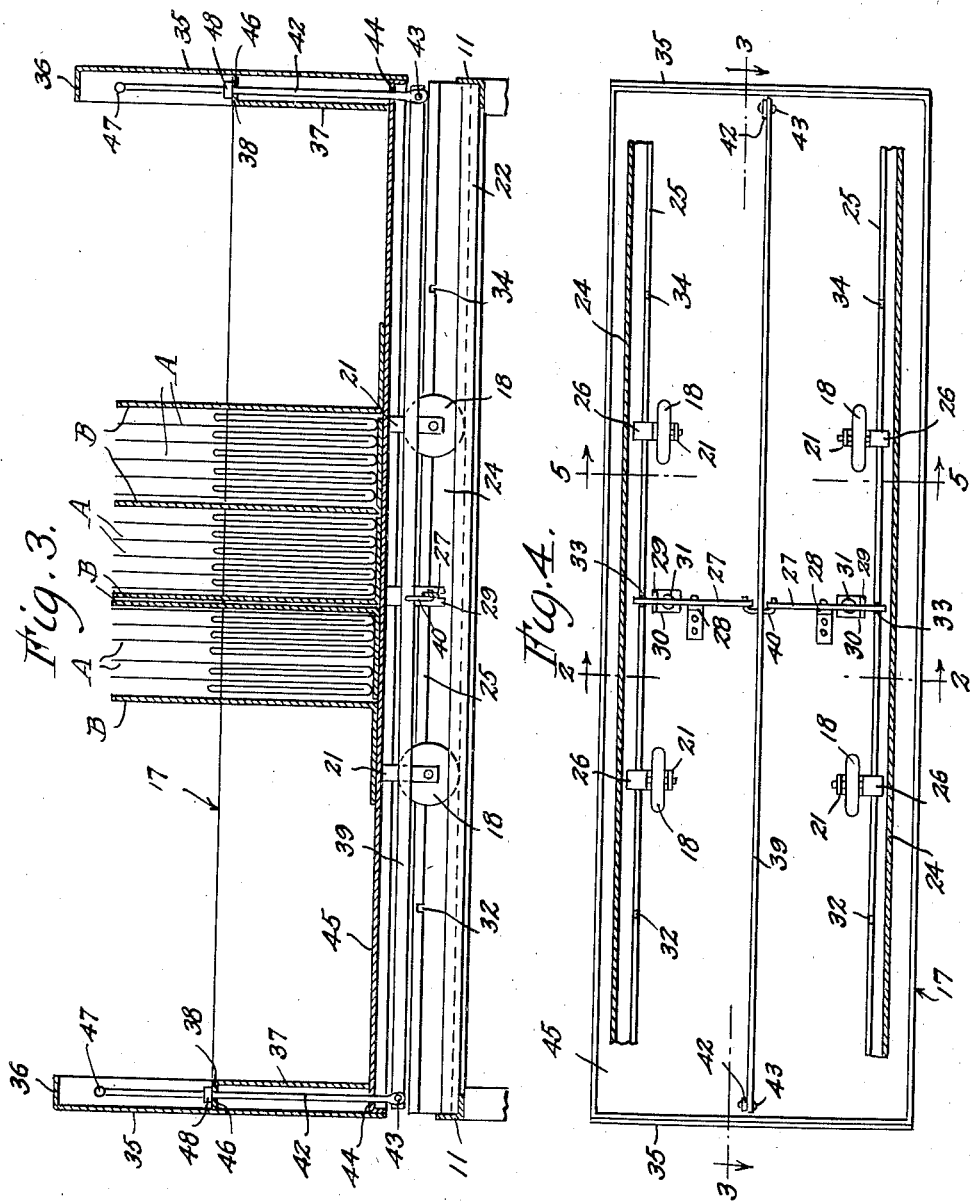

March 3, 1942.  J. B. MURRAY  2,274,908
FILING APPARATUS
Filed Jan. 23, 1941  3 Sheets-Sheet 3
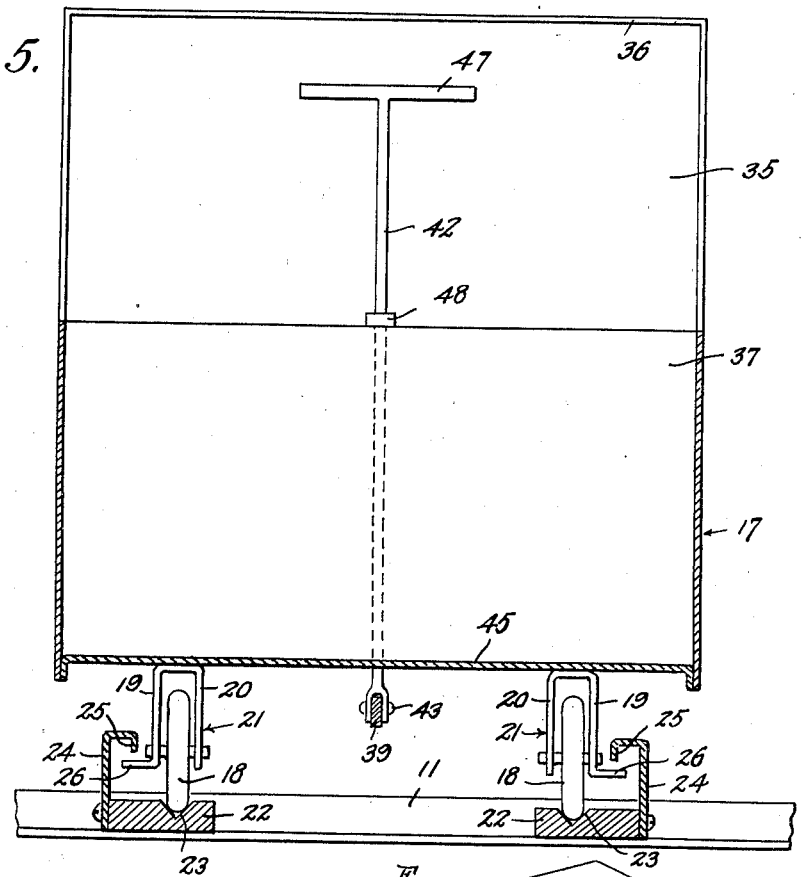
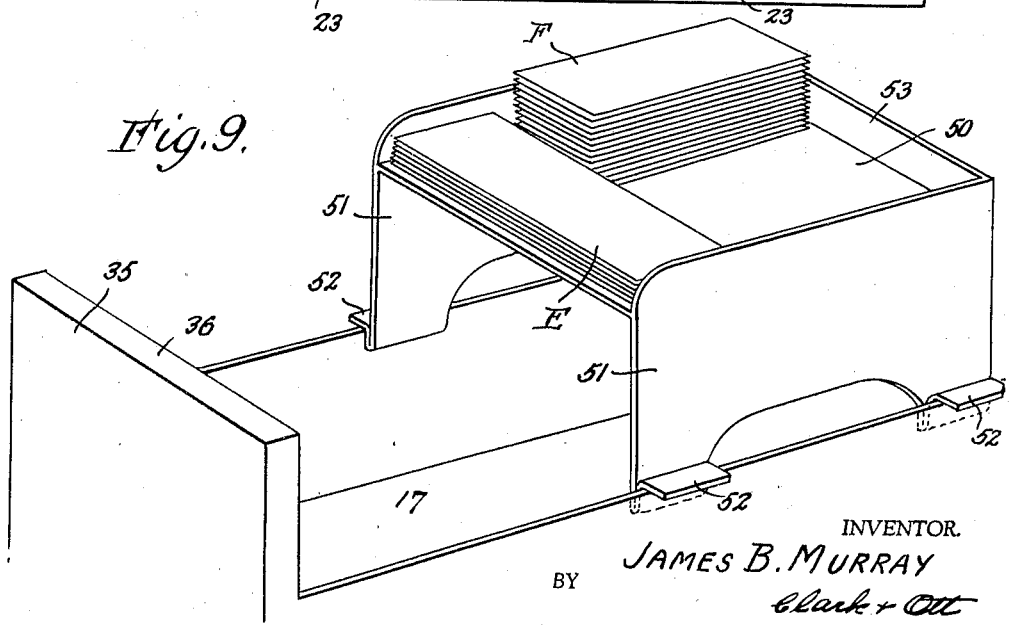
INVENTOR.
JAMES B. MURRAY
BY
Clark + Ott
ATTORNEYS Patented Mar. 3, 1942

2,274,908

UNITED STATES PATENT OFFICE 2,274,908

FILING APPARATUS

James B. Murray, Garden City, N. Y.

Application January 23, 1941, Serial No. 375,571

6 Claims. (Cl. 45—2)

This invention relates to filing equipment and has particular reference to an improved apparatus of a character which is primarily adapted for the filing of current statements requiring repeated posting of entries thereon and which apparatus is so constructed and arranged as to permit of the filing and posting at opposite ends thereof.

The invention broadly comprehends a translatory filing apparatus including one or more filing receptacles and a carriage upon which the same is mounted for movement in opposite directions to facilitate the posting and filing operations by the disposal of the opposite ends thereof within convenient reach of the posting and filing operator, and whereby the carriage is movable to progressively locate the receptacle in juxtaposition to the posting operator.

More particularly the invention comprehends in a filing apparatus of the indicated character, a plurality of longitudinally spaced filing receptacles mounted upon and selectively movable with reference to a supporting carriage for optionally disposing the opposite ends of each receptacle in projected relation with the carriage and which carriage is movable so as to render the receptacles progressively accessible from either end by advancing the carriage at right angles to the direction of movement of the receptacle together with manually operable means located at opposite ends of the receptacle for latching the same in relative positions with reference to the carriage.

With the foregoing and other objects in view, reference is now made to the following specification and accompanying drawings in which there is illustrated a preferred embodiment of the invention.

In the drawings:

Fig. 1 is a perspective view of a filing apparatus constructed in accordance with the invention.

Fig. 2 is an enlarged fragmentary vertical sectional view taken transversely of one of the drawers approximately on the line 2—2 of Fig. 4.

Fig. 3 is an enlarged fragmentary longitudinal sectional view taken approximately on the line 3—3 of Fig. 4.

Fig. 4 is an enlarged bottom plan view of one of the drawers, showing portions of the guard rails in section.

Fig. 5 is an enlarged vertical sectional view transversely of one of the drawers taken approximately on the line 5—5 of Fig. 4.

Figs. 6, 7 and 8 are diagrammatic plan views illustrating the relative positions of the filing apparatus to the posting machine and operator.

Fig. 9 is a perspective view of the portable tray mounted on one of the drawers.

Referring to the drawings by characters of reference, the apparatus includes a carriage 10, preferably consisting of an angle iron frame structure composed of upper and lower side rails 11 and 12 and upper and lower end rails 13 and 14 secured at their opposite ends to corner posts 15 and in the lower ends of which corner posts caster rollers 16 are swively mounted for universal rolling movement of the carriage.

Supported upon the carriage 10 is one or more receptacles such as file drawers 17, three being shown in the present embodiment, which are disposed in horizontally spaced side by side relation and of a length that their opposite ends are substantially flush with the opposite side rails 11 when the drawers are transversely centered on the carriage.

The drawers 17 are each similarly mounted upon wheels 18 which are preferably located so as to dispose a pair in transverse axial alignment inwardly from each end of the drawer a distance slightly more than one-third the length thereof and with the wheels of one pair respectively in alignment longitudinally of the drawer with the wheels of the other pair. The wheels 18 are each journaled in depending legs 19 and 20 of an inverted U-shaped bracket 21 secured to the underside of the drawers, and extending longitudinally thereof and under the aligned wheels at each side of the drawer are bars 22 secured at their opposite ends to the inturned flanges of the opposite side rails 11 of the carriage 10. The bars 22 are provided in their upper surfaces with V-shaped grooves 23 providing guide tracks in which the wheels have bearing contact for rolling movement of the drawers respectively for selectively projecting the same in opposite directions with reference to the carriage.

Secured to the outer side face of each of the bars 22 longitudinally thereof is an upstanding guard rail 24 having its upper edge portion bent inwardly and downwardly to dispose the depending upper edge 25 in spaced parallel relation therewith and in superposed relation to angulated terminals 26 projecting outwardly from the lower end of the depending legs 19 of adjacent wheel brackets 21 for retaining the drawers upon the carriage and for preventing accidental displacement of the drawer wheels from the grooves 23.

In order to latch the drawers in relative fixed positions with reference to the carriage 10, each drawer is provided with a pair of aligned transverse latching levers 27 disposed centrally thereof which are respectively pivoted intermediate their length in the lower ends of depending brackets 28 secured to the underside of the drawer. The latching levers 27 adjacent their outer ends have guided vertical sliding movement between the bifurcated lower ends 29 of depending angle brackets 30 secured to the underside of the drawer and the free outer ends of said levers 27 are urged upwardly against the depending upper edges 25 of the guard rails 24 respectively by means of coiled contractile springs 31 secured at their upper ends to the underside of the drawer and at the lower ends to the levers 27 respectively between the brackets 28 and 30. The springs 31 function when the drawers are moved to and from projected relation with the carriage 10 to effect the automatic engagement of the outer ends of the levers 27 in pairs of aligned notches 32, 33 and 34 located as desired in the depending upper edges 25 of the opposite upstanding guard rails 24.

The notches 32 of each pair of guard rails 24 are located inwardly from one side of the carriage so that when the latching levers 27 are positioned therein, the end of the drawer will project beyond the carriage 10 a distance substantially one-third the length of the drawer and in which position the peripheries of the wheels 18 adjacent the projected end of the drawer will be disposed in close proximity to the upstanding flange of the side rail 11 to serve as stop means for preventing complete displacement of the drawers from the carriage. The guard rail notches 34 are similarly located inwardly from the opposite side of the carriage so that when the latching levers 27 are positioned therein, the drawer will project from the said side of the carriage a distance substantially one-third the length of the drawer and in which position the peripheries of the other pair of wheels 18 will be in close proximity to the upstanding flange of the opposite side rails 11 to serve as stop means for preventing complete displacement of the drawers from said side of the carriage. The notches 33 are located medially of the carriage in order to latch the drawers in relative fixed position centrally of the carriage when the ends of the levers are positioned therein.

The opposite end of each drawer is formed with an end wall 35 having an inwardly directed flange 36 at the upper edge thereof and a partition 37 is secured within the lower portion of the drawer in spaced parallel relation to the end wall with an outwardly directed flange 38 at the upper edge thereof extending towards and secured to the end wall.

In order to provide means for manually releasing the latching levers 27, each drawer carries a longitudinally extending centrally disposed release bar 39 which is pivotally connected intermediate its ends to the inner ends of the latching levers 27 by a U-shaped link 40, the bight portion of which is swingably mounted transversely of the release bar and the free lower ends of the arm portions of which are pivotally attached to the confronting ends of the latching levers 27. A shift rod 42 is pivotally connected as at 43 to each of the opposite ends of the release bar 39 and said rod extends upwardly through an opening 44 in the bottom wall 45 of the drawer and thence upwardly between the end wall 35 and the partition 37 and through an opening 46 in the flange 38. Each rod 42 is provided at its upper end with a transverse manipulating handle 47 located below the inwardly directed flange 36 in a convenient position to be engaged by the fingers of the operator for exerting an upward pull on the handle while the palm of the hand rests upon the flange 36 for moving the drawer with reference to the carriage after the latching levers are released from the notches.

Each shift rod 42 is provided with a stop collar 48 located above and normally seated upon the flange 38 to serve as a means for supporting the shift rods and the release bar 39 and to cooperate with the flange 38 to provide a fulcrum for one end of the release bar when the other end is drawn upwardly to disengage the latching levers from the notches.

While the filing apparatus may be employed for any purpose, it is primarily adapted for use by banking institutions for the filing of folders containing current monthly statements of depositors' accounts together with the canceled vouchers. In order to illustrate this use of the apparatus, the folders A are shown in the drawer in Fig. 3 of the drawings, the same being arranged in back to back relation facing towards opposite ends of the drawer with angulated spacing members B interposed between groups of the folders.

In order to demonstrate the manner in which the apparatus is used, the same is shown diagrammatically in Figs. 6, 7 and 8. The carriage 10 is arranged alongside a posting machine C at the right hand side of the operator's seat D so that the drawer 17 at the left of the carriage is initially drawn outwardly within convenient reach of the operator seated at the machine to facilitate access to the folders for the removal of the statements and vouchers for posting the vouchers on the statements and the replacement of the folders in the drawer. After the contents of the folders at the forward half of the drawer have been completed, the operator returns the drawer to its normal position and shifts the carriage to the left from the position shown in Fig. 6 to the position shown in Fig. 7 and moves the center drawer outwardly for the posting operation. After the contents at the forward half of this drawer have been posted, the same is returned to its normal position and the carriage is again shifted to the left to bring the right hand drawer in juxtaposition to the operator and posting machine. The position of the carriage is then reversed to bring the opposite side thereof in juxtaposition to the operator and the contents of the opposite halves of the drawers are successively posted in a similar manner. While the posting operator is at work on one of the drawers, it is obvious that another operator may concurrently file or check statements and vouchers in the opposite half of the drawers not being used by the posting operator. Thus the filing apparatus provides a repository for maintaining canceled checks or vouchers in individual folders in associated relation with the bank statement of each depositor so that the vouchers are not likely to become commingled with those of other depositors by means of which repeated counting of the vouchers and back checking the same against entries on the statement is avoided.

In order to provide means for facilitating the filing of the canceled vouchers and the checking of the tickets or deposit slips against the statements, the apparatus further includes a portable tray 50 adapted to be mounted on the filing drawers 17 and said tray is provided with parallel depending side panels 51 which are adapted to fit between the opposite side walls of the drawers 17. The side panels 51 are provided adjacent their lower ends with outwardly directed ledges 52 adapted to seat upon the upper edges of the opposite side walls of the drawer for supporting the tray in superposed relation to the folders and for guided sliding movement with reference to the drawer. The tray 50 is formed with an upstanding marginal rim 53 extending along the rear and opposite side edges thereof whereby the tray defines an elevated horizontal surface to support thereon deposit slips E for checking against the statements in the folders A and for supporting the canceled vouchers F for filing in said folders.

What is claimed is:

1. In a filing apparatus, a carriage, a file drawer, cooperating means carried by said drawer, and carriage supporting said drawer on said carriage for guided rolling movement of the drawer to and from projected relation with reference to opposite edges of the carriage, a guard rail secured to said carriage longitudinally of the drawer and having spaced notches therein, a latching lever pivoted to the underside of the drawer, means for urging the outer end of the lever into engagement with said notches respectively for latching the drawer in predetermined fixed relations to the carriage, a release bar extending longitudinally of the drawer and connected with the inner end of said latching lever, upwardly extending shift rods carried by the drawer at the ends thereof respectively for limited vertical movement and supporting said release bar at the opposite ends thereof, and a manipulating handle at the upper end of each of said shift rods adapted to be manually raised for optionally raising the opposite ends of the release bar for releasing the lever from latched engagement with said notches for freeing the drawer from fixed relation with reference to the carriage.

2. In a filing apparatus, a carriage, a file drawer, cooperating means carried by said drawer and carriage supporting said drawer on said carriage for guided rolling movement of the drawer to and from projected relation with reference to opposite edges of the carriage, a guard rail recured to said carriage longitudinally of the drawer and having spaced notches therein, a latching lever pivoted to the underside of the drawer, means for urging the outer end of the lever into engagement with said notches respectively for latching the drawer in predetermined fixed relations to the carriage, a release bar extending longitudinally of the drawer and pivotally connected with the inner end of said latching lever, upwardly extending shift rods carried by the drawer at the ends thereof respectively for limited vertical movement and pivotally connected with and supporting said release bar at the opposite ends thereof, and a manipulating handle at the upper end of each of said shift rods adapted to be manually raised for optionally raising the opposite ends of the release bar for releasing the lever from latched engagement with said notches for freeing the drawer from fixed relation with reference to the carriage.

3. In a filing apparatus, a carriage, a file drawer, guide tracks carried by said carriage, wheels on the underside of said drawer engaging in said tracks for guided rolling movement of the drawer to and from projected relation with reference to opposite edges of the carriage, a guard rail secured to said carriage on each side of said track, said guard rails having their upper portions inwardly and downwardly bent to define downwardly directed upper edge portions and having spaced notches therein, a pair of aligned transverse latching levers pivoted to the underside of the drawer, means for urging the end of the levers into engagement with the notches in said guard rails respectively for latching the drawer in predetermined fixed relations to the carriage, a release bar extending longitudinally of the drawer and pivotally connected with the inner ends of said latching levers, upwardly extending shift rods carried by the drawer at the ends thereof respectively for limited vertical movement and pivotally connected with and supporting said release bar at the opposite ends thereof and extending upwardly through said drawer, a manipulating handle at the upper end of each of said shift rods extending upwardly through said drawer adapted to be manually raised for optionally raising the opposite ends of the release bar for releasing the latching levers from latched engagement with the notches in said guard rails for freeing the drawer for movement with reference to the carriage.

4. In a filing apparatus, a carriage, a file drawer, guide tracks carried by said carriage, wheels on the underside of said drawer engaging in said tracks for guided rolling movement of the drawer to and from projected relation with reference to opposite edges of the carriage, a guard rail secured to said carriage on each side of said track, said guard rails having their upper portions inwardly and downwardly bent to define downwardly directed upper edge portions and having spaced notches therein, a pair of aligned transverse latching levers pivoted to the underside of the drawer, means for urging the end of the levers into engagement with the notches in said guard rails respectively for latching the drawer in predetermined fixed relations to the carriage, a release bar extending longitudinally of the drawer and pivotally connected with the inner ends of said latching levers, upwardly extending shift rods pivotally connected with said release bar at the opposite ends thereof and extending upwardly through said drawer, a collar on each shift rod engageable with the drawer for limiting the downward movement of the shift rod, a manipulating handle at the upper end of each of said shift rods extending upwardly through said drawer adapted to be manually raised for optionally raising the opposite ends of the release bar for releasing the latching levers from latched engagement with the notches in said guard rails for freeing the drawer for movement with reference to the carriage.

5. In a filing apparatus, a support, a file drawer, cooperating means carried by said drawer and support mounting said drawer for guided movement to and from projected relation with reference to opposite edges of the support, latch means pivoted to the drawer, keeper means carried by the support, means for urging said latch means to automatically engage said keeper means as the drawer is moved to and from projected relation for latching said drawer in relative fixed position with relation to the support, and longitudinally extending manipulating means carried by the drawer at the opposite ends thereof and connected with said latch means and engageable manually at opposite ends of the drawer for releasing the latch means from engagement with the keeper means for freeing the drawer for movement on the support.

6. In a filing apparatus, a support, a file drawer, means mounting said drawer on the support for guided movement of the drawer to and from projected relation with reference to opposite sides of the support, interengageable latch and keeper means carried by the drawer and support for latching said drawer in fixed projected relation, means for urging said latch and keeper means into latched engagement, and latch releasing means connected intermediate the ends thereof with the latch means and supported by the drawer at the opposite ends thereof for vertical rocking movement by manipulation thereof at either end of the drawer for effecting the disengagement of the latch and keeper means and the release of the drawer from relative fixed relation with the support.

JAMES B. MURRAY.